(12) United States Patent
Amano (10) Patent No.: US 8,212,917 B2
(45) Date of Patent: Jul. 3, 2012

(54) IMAGING APPARATUS

(75) Inventor: Ken-ichiro Amano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 359 days.

(21) Appl. No.: 12/670,178

(22) PCT Filed: Sep. 12, 2008

(86) PCT No.: PCT/JP2008/066915
§ 371 (c)(1),
(2), (4) Date: Jan. 22, 2010

(87) PCT Pub. No.: WO2009/035147
PCT Pub. Date: Mar. 19, 2009

(65) Prior Publication Data
US 2010/0194967 A1 Aug. 5, 2010

(30) Foreign Application Priority Data

Sep. 14, 2007 (JP) ................................ 2007-238948

(51) Int. Cl.
*G03B 13/00* (2006.01)
*H04N 5/232* (2006.01)
(52) U.S. Cl. ........................................ 348/350; 348/353
(58) Field of Classification Search .................. 348/345, 348/349, 350, 353, 354, 276, 277
See application file for complete search history.

(56) References Cited

U.S. PATENT DOCUMENTS

| | | | | |
|---|---|---|---|---|
| 5,597,999 A * | 1/1997 | Kinba et al. | ............... | 250/201.7 |
| 6,597,868 B2 | 7/2003 | Suda | .............................. | 396/111 |
| 6,819,360 B1 | 11/2004 | Ide et al. | ........................ | 348/340 |
| 6,829,008 B1 | 12/2004 | Kondo et al. | ................. | 348/302 |
| 2001/0036361 A1 * | 11/2001 | Suda | ............................... | 396/111 |
| 2004/0042780 A1 | 3/2004 | Kindaichi et al. | ............. | 396/112 |
| 2004/0202461 A1 * | 10/2004 | Nakahara | ....................... | 396/104 |
| 2007/0122137 A1 * | 5/2007 | Ohnishi | ......................... | 396/123 |
| 2007/0126909 A1 * | 6/2007 | Kuruma | ................... | 348/333.01 |
| 2007/0230937 A1 * | 10/2007 | Ide et al. | ........................ | 396/125 |

(Continued)

FOREIGN PATENT DOCUMENTS

JP 9-043507 2/1997

(Continued)

OTHER PUBLICATIONS

Dec. 9, 2008 International Search Report and Written Opinion in PCT/JP2008/066915.

*Primary Examiner* — Jason Whipkey (74) *Attorney, Agent, or Firm* — Fitzpatrick, Cella, Harper & Scinto (57) ABSTRACT

An imaging apparatus includes an image pickup device that includes a first pixel group configured to photoelectrically convert an object image formed by a luminous flux from an imaging optical system, and a second pixel group which includes a plurality of pixels configured to photoelectrically convert a split pair of the luminous flux from the imaging optical system and a detecting unit configured to implement a first detection control that changes an imaging state of the image pickup device while detecting a contrast of the object image based on an output of the second pixel group, and then a second detection control that changes the imaging state of the image pickup device while detecting the contrast of the object image based on an output of the first pixel group.

6 Claims, 7 Drawing Sheets

U.S. PATENT DOCUMENTS

| | | | |
|---|---|---|---|
| 2008/0118238 A1* | 5/2008 | Sogawa et al. | 348/353 |
| 2008/0259202 A1* | 10/2008 | Fujii | 348/345 |
| 2009/0067828 A1* | 3/2009 | Ono et al. | 396/128 |
| 2009/0086084 A1* | 4/2009 | Komaba et al. | 348/349 |

FOREIGN PATENT DOCUMENTS

| | | |
|---|---|---|
| JP | 2000-156823 | 6/2000 |
| JP | 2000-292686 | 10/2000 |
| JP | 2001-305415 | 10/2001 |
| JP | 2003-244712 | 8/2003 |
| JP | 2004-46132 | 2/2004 |
| JP | 2005-106994 | 4/2005 |
| JP | 2006-154065 | 6/2006 |
| JP | 2007-158692 | 6/2007 |

* cited by examiner

IMAGING APPARATUS

TECHNICAL FIELD

The present invention relates to an imaging apparatus, such as a digital camera and a video camera, and more particularly to an imaging apparatus which implements focus control by using an output from an image pickup device.

BACKGROUND ART

Japanese Patent Laid-Open No. ("JP") 2000-156823 discloses an imaging apparatus configured to use an optical characteristic of a part of pixels in an image pickup device in the imaging apparatus differently from other pixels and to implement focus detections based on an output from the part of pixels.

Figure 6:
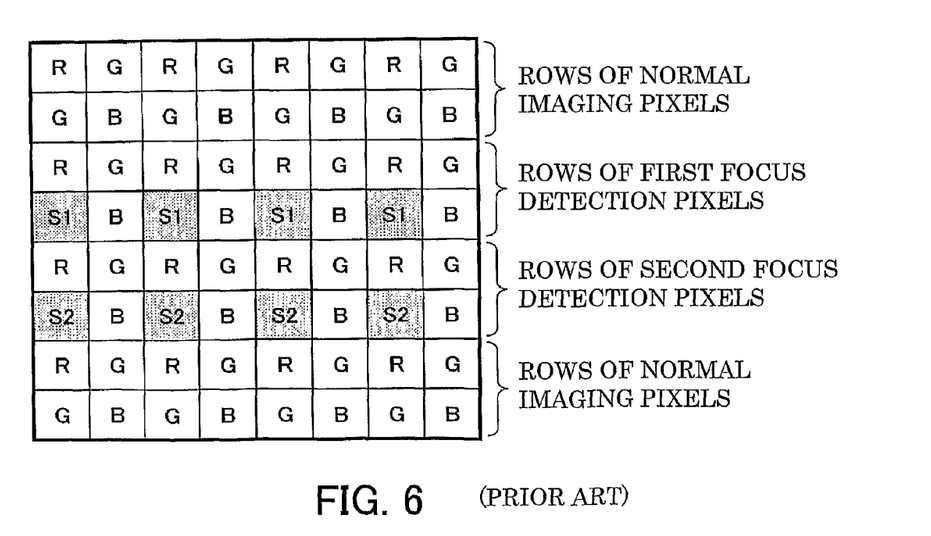
FIG. 6 is a diagram showing an arrangement of an imaging pixel group and a focus detection pixel group.

The imaging apparatus disclosed in JP 2000-156823 arranges plural pairs of focus detection pixels in the part of the image pickup device. FIG. 6 shows an illustrative pixel arrangement of an image pickup device that arranges focus detection pixels in some part of rows in a pixel matrix.

In FIG. 6, R, G, and B are normal imaging pixels in which a red filter, a green filter, and a blue filter are respectively arranged. S1 and S2 are first and second focus detection pixels which have different optical characteristics from the imaging pixels.

Figure 7:
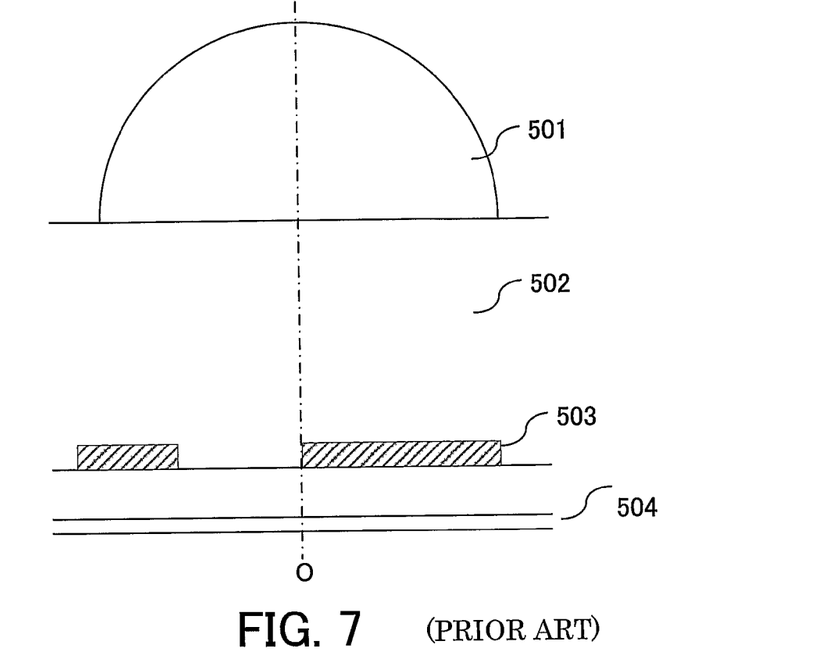
FIG. 7 is a diagram showing a structure of a first focus detection pixel.

FIG. 7 shows a structure of the first focus detection pixel S1. In FIG. 7, a micro lens 501 is formed on the light incident side of the first focus detection pixel. 502 is a smoothing layer that has a flat surface configured to form the micro lens 501.

503 is a light shielding layer which includes a stop aperture part that is decentered in one direction with respect to a center O of the photoelectric conversion area 504 in the first focus detection pixel S1.

Figure 8:
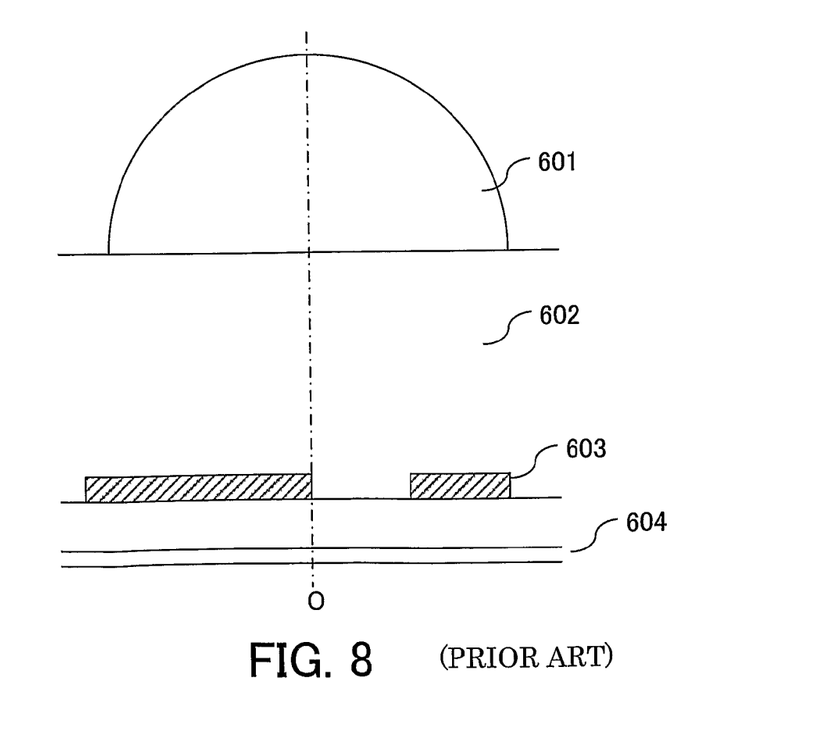
FIG. 8 is a diagram showing a structure of a second focus detection pixel.

FIG. 8 shows a structure of the second focus detection pixel S2. In FIG. 8, a micro lens 601 is formed on the light incident side of the second focus detection pixel. 602 is a smoothing layer that has a flat surface configured to form the micro lens 601.

603 is a light shielding layer which has a stop aperture part decentered in an opposite direction from the light shielding layer 503 in the first focusing detection pixel S1 with respect to the center O of the photoelectric conversion area 604 in the second focus detection pixel S2. In other words, the light shielding layers 503 and 603 in the first and second focus detection pixels S1 and S2 include stop aperture parts that are placed symmetrically with respect to the optical axis of each micro lens.

This structure provides an equivalent structure of symmetrical splitting of a pupil in the imaging optical system between the first focus detection pixel S1 and the second focus detection pixel S2.

In FIG. 6, the rows which include the first focus detection pixels S1 and those which include the second focus detection pixels S2 are set such that the two images can be closer to each other as the number of pixels in the image pickup device increases. The rows including the first focus detection pixels S1 and those including the second focus detection pixels S2 have the same outputs (or image signals) when the imaging optical system is in an in-focus state to the object.

On the other hand, when the imaging optical system is in an out-focus state, a phase difference occurs between the image signals derived from the rows including the first focus detection pixels S1 and those including the second focus detection pixels S2. The phase-difference directions are opposite between the front focus state and the back focus state.

Figure 9A:
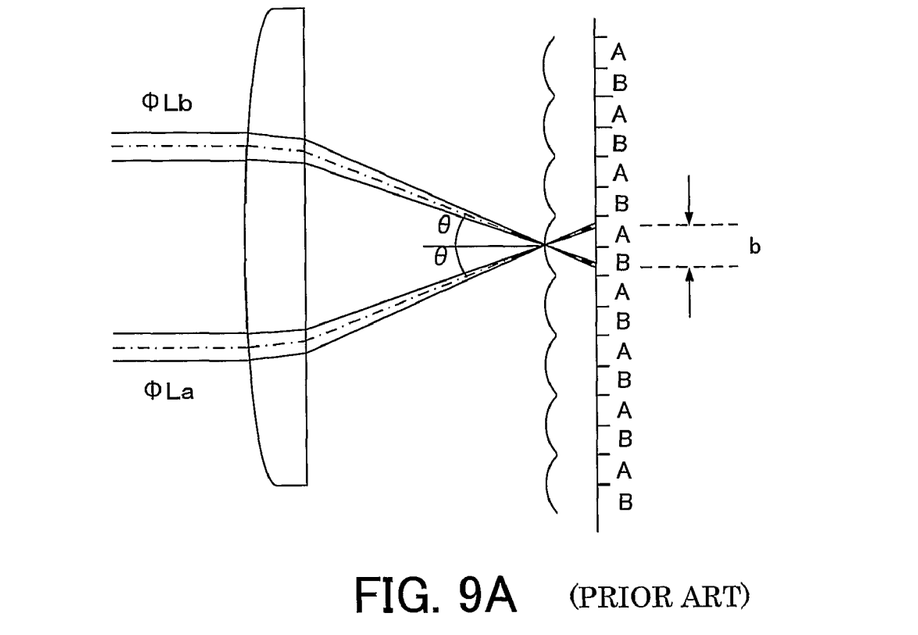
FIG. 9A is a schematic view of a phase difference in image signals in accordance with an in-focus state.
Figure 9B:
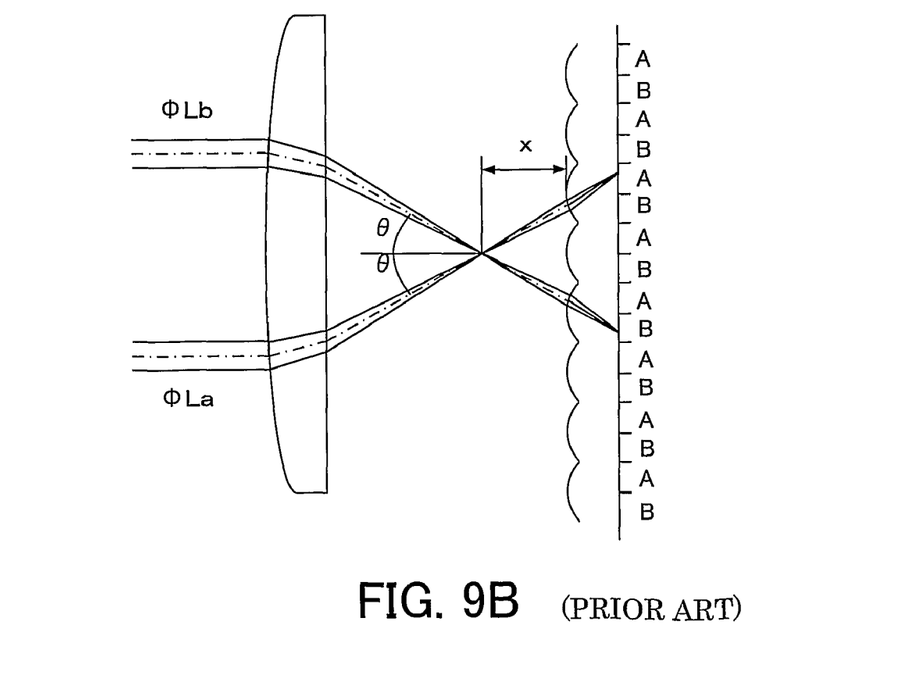
FIG. 9B is a schematic view of a phase difference in image signals in accordance with a (front) focus state.

FIGS. 9A and 9B show relationships of focusing states and phase differences. In these figures, both focus detection pixels S1 and S2 are moved closer to one another, and referred to as points A and B. The imaging pixels are omitted.

A luminous flux from a specific spot on the object is split into a luminous flux $\Phi$ La that is incident upon a focus detection pixel A via the split pupil corresponding to the focus detection pixel A and a luminous flux $\Phi$ Lb that is incident upon a focus detection pixel B via the split pupil corresponding to the focus detection pixel B. These two luminous fluxes are incident from the same point on the object, and can reach one point on the image pickup device via the same micro lens, as shown in FIG. 9A, when the imaging optical system is in the in-focus state to the object. Accordingly, the image signals from the rows including the first focus detection pixels A (S1) and those including the second focus detection pixels B (S2) correspond to one another.

However, in an out-focus state by a distance x shown in FIG. 9B, positions which the luminous fluxes $\Phi$ La and $\Phi$ Lb reach shift by an amount of change in the incident angles of $\Phi$ La and $\Phi$ Lb to the micro lenses. Consequently, a phase difference occurs between the image signals from the rows including the first focus detection pixels A (S1) and those including the second focus detection pixels B (S2).

With the foregoing in mind, the imaging apparatus disclosed in JP 2000-156823 implements focus control of a phase difference detection method that utilizes the image pickup device.

JP 2001-305415 discloses an imaging apparatus that is suitable for detections of a horizontal line and a vertical line of an object, and configured to implement both focus control of a phase difference detection method that utilizes an output from the image pickup device and focus control of a contrast detection method.

However, the imaging apparatus disclosed in JP 2000-156823 has a difficulty in properly obtaining a phase difference or a defocus amount because two images formed on the first and the second focus detection pixels are asymmetrical to one another as a defocus amount increases.

JP 2001-305415 discloses the imaging apparatus that applies a contrast detection method to focus control when a defocus amount obtained by the phase difference method is less reliable, but this reference is silent about proper use of the focus control of the contrast detection method that utilizes the focus detection pixels and the focus control of the contrast detection method that utilizes pixels other than the focus detection pixels.

DISCLOSURE OF INVENTION

The present invention provides an imaging apparatus that can implement both focus control of a contrast detection method that utilizes a focus detection pixel and focus control of a contrast detection method that utilizes a pixel other than the focus detection pixel, in addition to focus control of a phase difference detection method that utilizes a focus detection pixel.

An imaging apparatus according to one aspect of the present invention includes an image pickup device that includes a first pixel group configured to photoelectrically convert an object image formed by a luminous flux from an imaging optical system, and a second pixel group which includes a plurality of pixels configured to photoelectrically convert a split pair of the luminous flux from the imaging optical system and a detecting unit configured to implement a first detection control that changes an imaging state of the image pickup device while detecting a contrast of the object image based on an output of the second pixel group, and then a second detection control that changes the imaging state of the image pickup device while detecting the contrast of the object image based on an output of the first pixel group.

A control method for an imaging apparatus according to another aspect of the present invention provides an image pickup device that includes a first pixel group configured to photoelectrically convert an object image formed by a luminous flux from an imaging optical system, and a second pixel group which includes a plurality of focus detection pixels configured to photoelectrically convert a split one of the luminous fluxes from the imaging optical system. The control method includes steps of implementing a first focus control of a phase difference detection method which utilizes an output of the second pixel group, implementing a second focus control of a contrast detection method which utilizes an output of the first pixel group, implementing a third focus control of a contrast detection method which utilizes an output of the second pixel group, and changing a focus control to be implemented among the first to third focus controls.

Other features and advantages of the present invention will be apparent from the following description given in conjunction with the accompanying drawings, in which like reference characters designate the same or similar parts throughout the figures thereof.

BEST MODE FOR CARRYING OUT THE INVENTION

Referring now to the accompanying drawings, a description will be given of an embodiment of the present invention.

Figure 1:
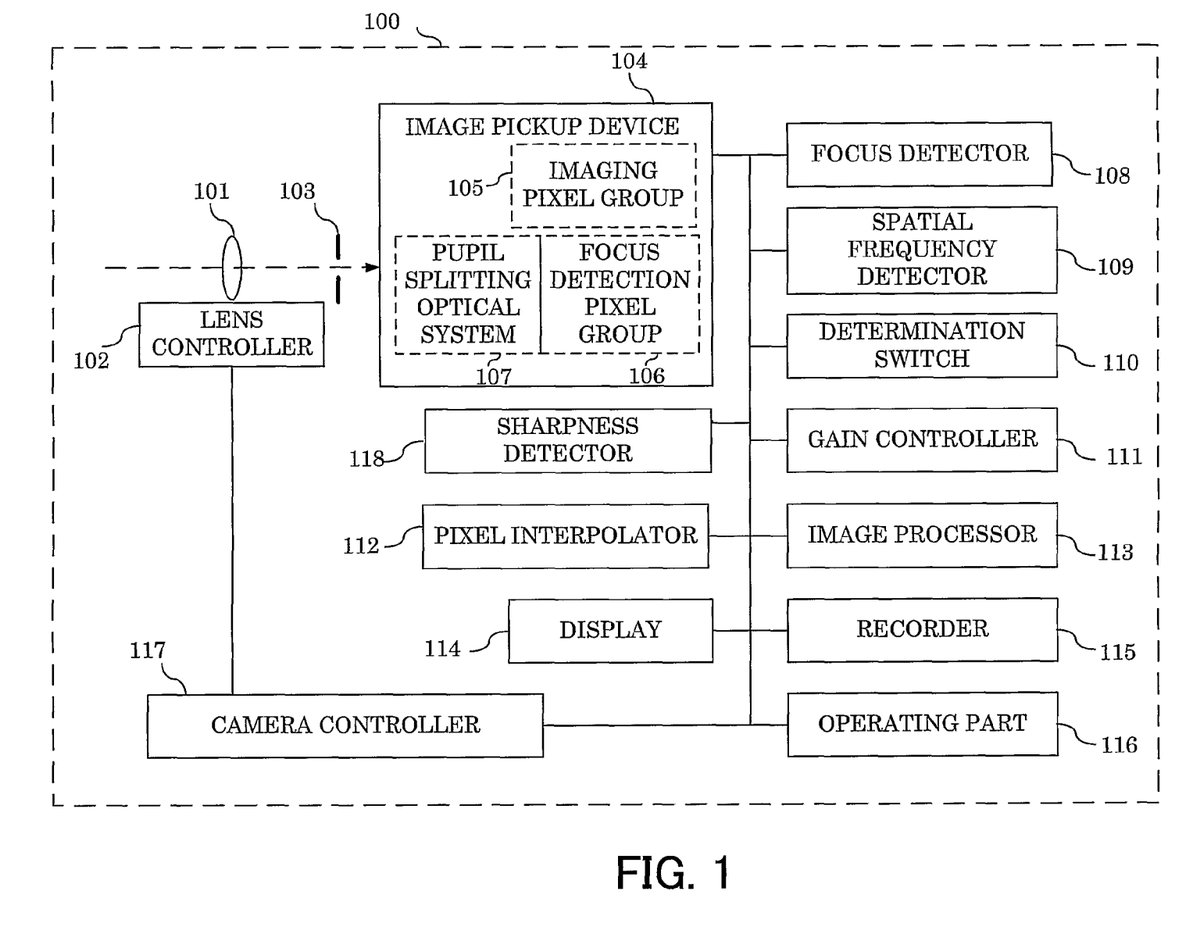
FIG. 1 is a block diagram showing a configuration of a digital camera according to an embodiment of the present invention.

FIG. 1 shows a configuration of a digital camera as an imaging apparatus according to one embodiment of the present invention.

A camera 100 includes an imaging optical system 101 which forms an object image using a luminous flux from the object, a lens controller 102 which controls a position of a focus lens (not shown) included in the imaging optical system 101, a stop 103 which adjusts an incident light intensity from the imaging optical system 101, and an image pickup device 104 as a photoelectric conversion element that is comprised by a CMOS sensor having a light receiving surface on which the object image is formed by a luminous flux from the imaging optical system 101.

The image pickup device 104 has any one of color filters R, G, and B, and an imaging pixel group (a first pixel group) 105 which has a plurality of imaging pixels for photoelectric conversions of the object image formed by the imaging optical system 101. The imaging pixel group 105 outputs an imaging signal used to generate the object image. The image pickup device 104 has a focus detection pixel group (a second pixel group) 106 which outputs a pair of image signals used to detect a focusing state (or for a focus detection) of the imaging optical system 101.

The focus detection pixel group 106 includes a plurality of first and second focus detection pixels for photoelectric conversions of a luminous flux pupil-split by a pupil splitting optical system 107, which will be described later. The first phase difference sensor has a plurality of first focusing detection pixels, and the second phase difference sensor has a plurality of second focus detection pixels. The first phase difference sensor outputs one of the above pair of image signals whereas the second phase difference sensor outputs the other of the pair of image signals.

The image pickup device 104 includes a pupil splitting optical system 107 configured to make a pupil-split luminous flux among the luminous fluxes from the imaging optical system 101 incident upon the first and second phase difference sensors.

Figure 2:
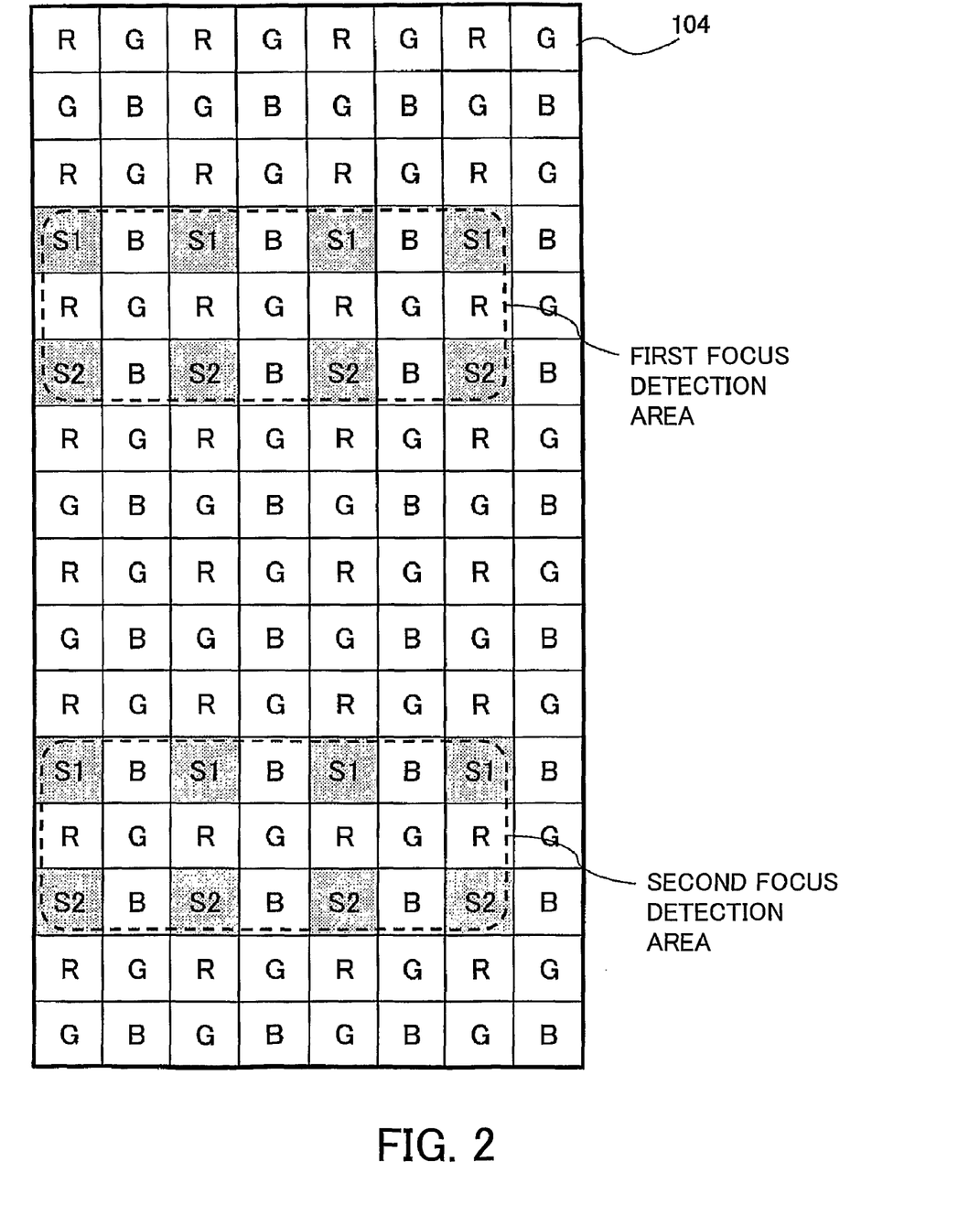
FIG. 2 is a diagram showing an arrangement of an imaging pixel group and a focus detection pixel group according to the embodiment.

FIG. 2 shows a pixel arrangement in the image pickup device 104 in this embodiment. In FIG. 2, S1 is the first focus detection pixel, and S2 is the second focus detection pixel in the focus detection group 106.

The first and second focus detection pixels S1 and S2 have similar structures to those shown in FIGS. 7 and 8. In other words, the light shielding layers in the first and the second focus detection pixels S1 and S2 have stop aperture parts placed symmetrically to one another with respect to the optical axis of the micro lens as a pupil splitting optical system 107.

In FIG. 2, pixel rows into which the first focus detection pixels S1 are discretely inserted form the first phase difference sensor. The pixel rows that are separated from the first phase difference sensor by a predetermined interval (or an interval of one pixel in FIG. 2) and discretely arrange the second focus detection pixels S2 form the second phase difference sensor. One focus detection pixel group (second pixel group) including the first and second phase difference sensors form one focus detection area. In FIG. 2, the first focus detection area and the second focus detection area are arranged on the top and the bottom of the image pickup device 104 respectively.

The camera 100 has a focus detector (or focus detecting unit) 108 which calculates a phase difference between a pair of image signals output from the first and second phase difference sensors in each focus detection area by applying a correlation operation.

The "pair of image signals output from the first and second phase difference sensors (in other words, the focus detection pixel group 106)," as used herein, means primarily a pair of image signals generated exclusively from output signals of the focus detection pixels S1 and S2. A pair of image signals may also be generated from output signals of the entire focus detection pixel group.

The focus detector 108 further calculates, based on a phase difference, a defocus amount indicative of a focusing state of the imaging optical system 101 to the object whose image is formed on the focus detection area.

In this embodiment, the focus detector 108 calculates a defocus amount, but the focus detector 108 may calculate a phase difference between the image signals and the camera control part 117, which will be described later, may calculate a defocus amount based on the phase difference. In addition, this embodiment regards a focusing state as a defocus amount, but a phase difference may be regarded as a focusing state.

In this way, the focus detector 108 provides individual focus detections for each focus detection area (or calculates a defocus amount).

As understood from FIGS. 7 and 8, the focus detection pixel group 106 (including the first and second focus detection pixels S1 and S2) has a limited view by a light shielding layer provided to each pixel and has no color filter. Accordingly, the level of the image signal from the focus detection pixel group 106 is different from that of the image signal output from a plurality of pixels near the focus detection pixel group 106 (hereinafter referred as to an adjacent pixel group) in the imaging pixel group 105.

For this reason, the camera 100 has a gain controller 111 configured to control a gain to the image signal from the focus detection pixel group 106 in order to make the level of the image signal from the focus detection pixel group 106 conform to that of the image signal from the adjacent pixel group.

The camera 100 further includes a spatial frequency detector (or frequency component detector) 109 configured to detect the intensity of a specific frequency component (or high frequency component) contained in the image signal from the adjacent pixel group (or imaging pixel group 105). The high frequency component represents a spatial frequency component of an object image formed in the adjacent pixel group (or the first pixel group).

The camera 100 further includes a determination switch 110. The determination switch 110 switches a determination criterion of an interpolation performed at a pixel interpolator 112, which will be described later, between the focusing state detected by the focus detection pixel group 106 and the intensity of the high frequency component detected by the spatial frequency detector 109.

The pixel interpolator (or image generator) 112 interpolates and generates image data corresponding to the focus detection pixel group 106 based on an output of the adjacent pixel group. In other words, based on the output of the imaging pixel group 105 (the adjacent pixel group), the pixel interpolator 112 generates a partial image corresponding to the focus detection pixel group 106 among the entire image obtained from an output from the image pickup device 104.

The "image data corresponding to the focus detection pixel group 106 (or the partial image)" may be image data to an area which entirely covers the focus detection pixel group 106 or image data for each of the focus detection pixels S1 or S2.

The camera 100 further includes an image processor 113 configured to provide image processes, such as a gamma correction, a white balance adjustment, resampling for display, and an image compression and encoding to an image signal output from the imaging pixel group 105.

The camera 100 further includes a display 114 configured to display (still) image data output from the image processor 113, a recorder 115 configured to record image data in a recording medium, such as a semiconductor memory or an optical disc, an operating part 116 which accepts a user's inputs, and a camera controller 117 as a controller configured to control the entire camera 100.

The camera controller 117 calculates a driving amount of the focus lens so as to obtain in-focus based on a defocus amount obtained from the focus detector 108. The calculated driving amount is output to the lens controller 102, which, in turn, moves the focus lens based on the driving amount.

Figure 4:
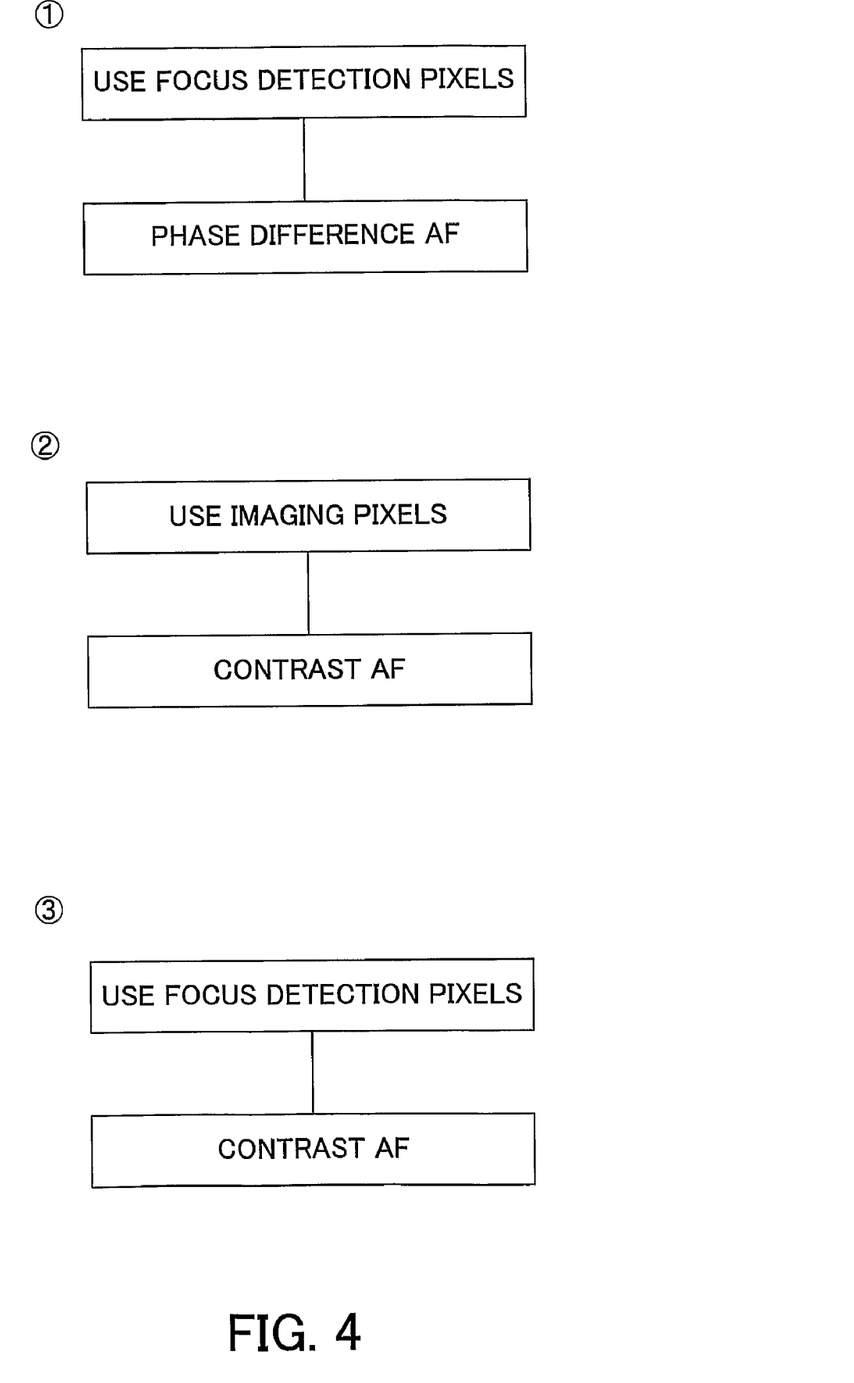
FIG. 4 is a diagram showing AF types of the camera according to the embodiment.

In this way, as shown in a circle "1" in FIG. 4, the camera controller 117 applies AF of a phase difference detection method (which is first focus control simply referred to as a "phase difference AF" hereinafter) which utilizes an output (or image signal) from the focus detection pixels 106 so as to obtain an in-focus state. However, this phase difference AF has a wider in-focus range than AF of a contrast detection method, which will be described later.

The camera 100 further includes a sharpness detector 118. The sharpness detector 118 detects (or extracts) a high frequency component contained in an image signal from the imaging pixel group 105 or the focus detection pixel group 106. Then, the sharpness detector 118 generates focus assessment information (or an AF assessment value signal) based on the high frequency component, and outputs it to the camera controller 117. The focus assessment information represents a contrast state of an object image, in other words, sharpness.

The camera controller 117 obtains the in-focus state by moving the focus lens to a position that provides the largest value of the focus assessment information. This is the contrast detection method AF, and the in-focus state can be obtained more precisely and rapidly when combined with the phase difference AF.

For example, the camera controller 117 initially performs the phase difference AF, and moves the focus lens to the vicinity of an in-focus position. Next, the camera controller 117 performs AF of a contrast detection method, and moves the focus lens to a more precise in-focus position. The AF of the contrast detection method is also effective in maintaining the in-focus state when the camera 100 takes motion pictures.

This embodiment may provide, as shown in a circle "2" in FIG. 4, AF of a contrast detection method (which is second focus control simply referred to as an "imaging pixel contrast AF" hereinafter) that utilizes an output (or imaging signal) from the imaging pixel group 105. An alternative embodiment may provide, as shown in a circle "3" in FIG. 4, AF of a contrast detection method (which is third focus control simply referred to as a "focus detection pixel contrast AF" hereinafter) which utilizes an output (or image signal) from the focus detection pixel group 106.

In the focus detection pixel contrast AF, any one of the outputs from the first and second focus detection pixels S1 and S2 may be used, or these outputs may be alternately used.

Figure 3:
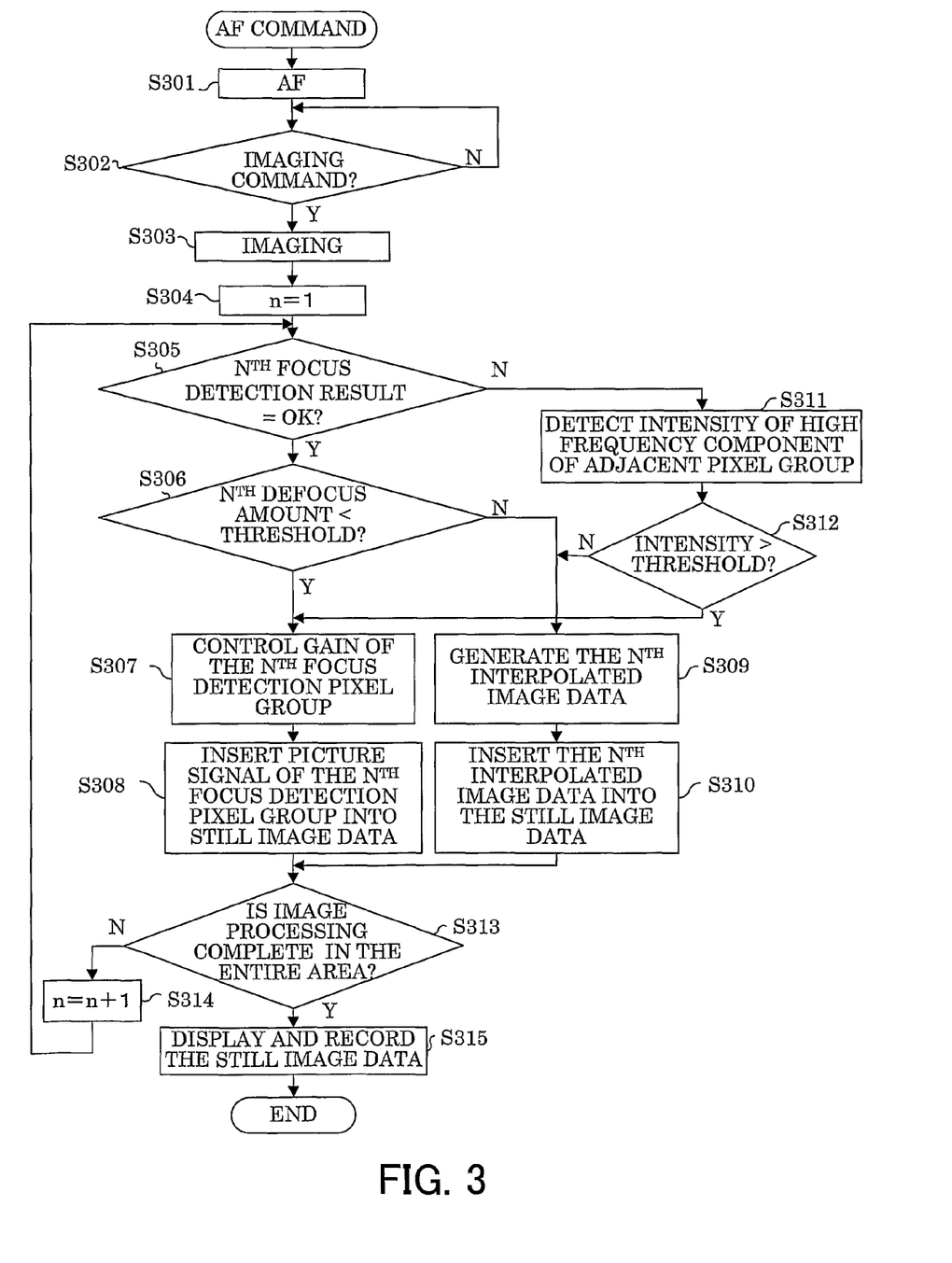
FIG. 3 is a flow chart of an operation of the camera according to the embodiment.

FIG. 3 shows an operation of the camera 100 (mainly the camera controller 117) according to this embodiment. The operation is implemented in accordance with a computer program which is stored in a memory (not shown) in the camera controller 117.

The camera controller 117 starts an operation from the step S301 in response to an AF command signal (e.g., a signal output by pressing a release button halfway) input by the operating part 116. Although not specifically described, an imaging preparation, such as an exposure calculation, is operated parallel to the AF operation.

In the step S301, the camera controller 117 implements an AF operation. When a defocus amount before the AF operation is implemented is small, the in-focus state is available by the phase difference AF which utilizes an output from the focus detection pixel group 106 described above. However, if a defocus amount before the AF operation is implemented is large, two images formed on the first and second focus detection pixels (or phase difference sensors) are asymmetrical to one another, and it will be difficult to accurately obtain a phase difference or a defocus amount.

Figure 5:
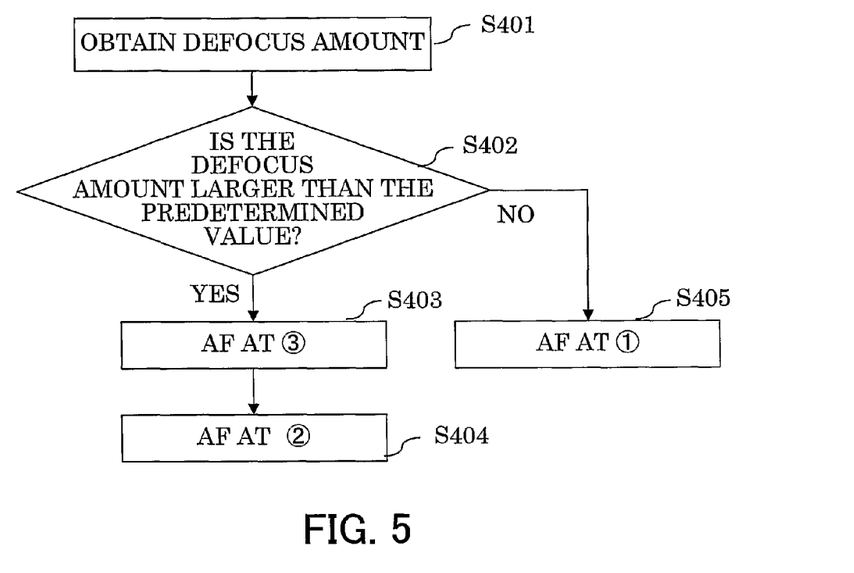
FIG. 5 is a flow chart of an operation of the AF types of the camera according to the embodiment.

For this reason, in the step S301, this embodiment performs the AF operation shown in FIG. 5.

In the step S401 shown in FIG. 5, the camera controller 117 instructs the focus detection pixel group 106 in the image pickup device 104 to initiate charge accumulations. After the charge accumulations are completed, the camera controller 117 outputs an image signal from the focus detection pixel group 106 to the focus detector 108. As described above, the focus detector 108 calculates a defocus amount, and outputs it to the camera controller 117. The camera controller 117 obtains the defocus amount from the focus detector 108.

Next, in the step S402, the camera controller 117 determines whether or not the obtained defocus amount is larger than a predetermined amount. If the defocus amount is smaller than the predetermined amount, the flow proceeds to the step S405 which implements the phase difference AF "1."

If the defocus amount is larger than the predetermined amount, the flow proceeds to the step S403 in which the camera controller 117 implements the focus detection pixel contrast AF "3." Then, the flow proceeds to the step S404.

In the step S404, the camera 117 implements the imaging pixel contrast AF "2." In this way, the flow proceeds to the step S302 when the defocus amount precisely reduces to the level of the in-focus state.

When the in-focus state is precisely obtained by the focus detection pixel contrast AF "3," the imaging pixel contrast AF "2" may be omitted. In other words, the imaging pixel contrast AF "2" may follow when the focus detection contrast AF "3" cannot provide the sufficiently precise in-focus state.

Thus, this embodiment can provide the in-focus state by the contrast AF which effectively utilizes the focus detection pixel group 106 by implementing the focus detection pixel contrast AF "3" and the imaging pixel contrast AF "2" even if the defocus amount is large. In other words, a proper in-focus state regardless of the level of the defocus amount is available through switching of the phase difference AF which utilizes the output from the focus detection pixel group 106, the focus detection pixel contrast AF "3," and the imaging pixel contrast AF "2."

Although this embodiment discusses switching of AF to be implemented among the AFs "1" to "3" according to the defocus amount, the AF to be implemented may be switched according to the object. For example, as will be described later, since the phase difference AF is less viable when the object has a repetitive pattern, the contrast AFs "2" and "3" may be implemented.

Since it is conceivable that an exposure condition may change due to a change in an object image after the AF operation moves the focus lens, the exposure calculation is repeated at a new focus-lens position, and the flow proceeds to the step S302.

In the step S302, the camera controller 117 determines whether or not an imaging command signal (e.g., a signal output by completely pressing a release button) is input from the operating part 116. If the imaging command signal has not yet been input, the determination of this step is repeated. When the imaging command signal is input, the flow proceeds to the step S303.

In the step s303, the camera controller 117 instructs the imaging pixel group 105 and the focus detection pixel group 106 in the image pickup device 104 to initiate charge accumulations. After the charge accumulations are completed, the camera controller 117 outputs an image signal of the image pickup device 105 to the spatial frequency detector 109 and the pixel interpolator 112, and outputs an image signal of the focus detection pixel group 106 to the focus detector 108 and the gain controller 111. After these outputs are made, the flow proceeds to the step S304.

In the step S304, the camera controller 117 initializes a counter (n=1). A numerical value of the counter, "n" corresponds to "n" focus detection areas in the image pickup device 104.

In the step S305, the camera controller 117 and the determination switch 110 determine whether or not the focus detection can be made in the $n^{th}$ focus detection area. If a defocus amount is obtained based on a phase difference between the image signals obtained from the focus detection pixels 106, the focus detection may not be properly implemented for an object having a repetitive pattern. Whether the image data interpolation is available according to the defocus amount cannot be determined based on the improper focus detection. Therefore, in such a case, this embodiment determines the availability of the image data interpolation based on a detection result of a high frequency component detected by the spatial frequency detector 109. This is because a high intensity of the high frequency component can be regarded as a small defocus amount in the imaging optical system 101.

The flow proceeds to the step S306 when the focus detection is available in the $n^{th}$ focus detection area, but proceeds to the step S311 when the focus detection is unavailable.

In the step S306, the camera controller 117 obtains a defocus amount in the $n^{th}$ focus detection area from the focus detector 108, and determines whether or not the defocus amount is smaller than a predetermined threshold (or first predetermined value). This determination also determines whether a spatial frequency of the object image formed on the $n^{th}$ focus detection area has a value enough for a good entire image through the image data interpolation by the pixel interpolator 112 configured to generate the image data which corresponds to the focus detection area (or focus detection pixel group 106).

Usually, an image signal (or object image) having a large defocus amount has a small amount of high frequency component (low contrast). On the other hand, an image signal (or object image) having a small defocus amount (near the in-focus state) has a large amount of high frequency component (high contrast). As described above, a drop of the sharpness of the image is not so conspicuous when the pixel interpolator 112 interpolates image data with a low spatial frequency of the object image, but that is conspicuous when the pixel interpolator 112 interpolates the image data with a high spatial frequency of the object image.

Accordingly, this embodiment controls the image data interpolation by the pixel interpolator 112 according to a level of a defocus amount when the focus detection has been successful: The flow proceeds to the step S307 without the image data interpolation for a defocus amount smaller than the threshold, and proceeds to the step S309 with the image data interpolation for a defocus amount equal to or larger than the threshold.

In the step S307, the camera controller 117 compares an average image signal in the $n^{th}$ focus detection area (referred to as an "$n^{th}$ focus detection pixel group 106" hereinafter) with an average image signal in the adjacent pixel group. Then, the gain controller 111 controls a gain applied to the image of the $n^{th}$ focus detection pixel group 106 such that these signal levels are identical or deemed to be identical. Alternatively, peak values of the image signals may be compared rather than comparing the average image signals of the pixel group with each other. The flow proceeds to the step S308 after the gain is thus controlled.

In the step S308, the camera controller 117 inserts an image signal of the $n^{th}$ focus detection pixel group 106 in which the gain is controlled in the step S307, into an area (or position) which corresponds to the $n^{th}$ focus detection pixel group 106 in the image signal of the imaging pixel group 105. This step can generate synthetic image data that synthesizes an image based on an image signal from the imaging pixel group 105 with a partial image based on the (gain-controlled) image signal from the $n^{th}$ focus detection pixel group 106. The camera controller 117 outputs the synthesized image data to the image processor 113. Then, the flow proceeds to the step S313.

In the step S309, the camera controller 117 directs the pixel interpolator 112 to generate the partial image data for the interpolation corresponding to the $n^{th}$ focus detection pixel group 106 through an interpolation calculation using the image signal of the adjacent pixel group of the $n^{th}$ focus detection pixel group 106. In other words, the image interpolator 112 generates the partial image corresponding to the $n^{th}$ focus detection pixel group 106, among the entire image obtained by the output from the image pickup device 104, based on the output of the imaging pixel group 105 (the adjacent pixel group).

This embodiment needs to interpolate a pixel signal of a green component particularly for the focus detection pixels S1 and S2 due to the periodic color-filter arrangement of the imaging pixel group 105. Accordingly, pixel signals corresponding to the positions of the focus detection pixels S1 and S2 are generated based on signals having green components which are adjacent in oblique directions to the focus detection pixels S1 and S2 of the adjacent pixel group in FIG. 2. The surrounding pixels used for the interpolation are not limited to those having green components, which are adjacent in oblique directions to the focus detection pixels S1 and S2 described above. In other words, an edge may be detected from a positional change of a signal level and the interpolation calculation that takes the edge position of the object image into account may be made by using distant pixels having green components.

The flow proceeds to the step S310 after the partial image data for the interpolation is generated.

In the step S310, the camera controller 117 inserts an image signal on the partial image data for the interpolation for the $n^{th}$ focus detection pixel group 106 generated in the step S309, into an area (or position) which corresponds to the $n^{th}$ focus detection pixel group 106 in the image signal of the imaging pixel group 105, thereby creating synthesized image data between the image based on the image signal from the imaging pixel group 105 and the partial image for the interpolation for the $n^{th}$ focus detection pixel group 106. The camera controller 117 outputs the synthesized data to the image processor 113. Then, the flow proceeds to the step S313.

In the step S311, the camera controller 117 directs the spatial frequency detector 109 to detect a high frequency component from the image signal of the adjacent pixel group for the $n^{th}$ focus detection group 106.

In the step S312, the camera controller 117 determines whether or not the intensity of the high frequency component detected in the step S311 is higher than a predetermined threshold (or a second predetermined value).

If the intensity of the high frequency component is higher than the threshold as described above (or when the contrast is high), the defocus amount of the imaging optical system 101 is considered small. Then, the step S305 can provide focus detection, and the step S306 operates as if the defocus amount is smaller than the threshold. On the other hand, if the intensity of the high frequency component is lower than the threshold (or when the contrast is low), the defocus amount of the imaging optical system 101 is considered large. Then, the step S305 can provide focus detection, and the step S306 operates as if the defocus amount is greater than the threshold.

In other words, the flow proceeds to the step S307 without the image data interpolation when the detected intensity is higher than the threshold, and proceeds to the step S309 for the image data interpolation if the detection intensity is lower than the threshold.

In the step S313, the camera controller 117 determines whether or not the processes in the steps S305 to S312 are completed to all or "n" focus detection areas. The flow proceeds to the step S314, and returns to the step S305, after incrementing a counter value by one when the processes are not completed to all of the focus detection areas. Thereby, the above processes are performed for the next focus detection area. On the other hand, the flow proceeds to the step S315 if the processes are completed to all of the focus detection areas.

In the step S315, the camera controller 117 directs the image processor 113 to implement a gamma correction, a white balance adjustment, resampling for display, and an image compression and encoding to the synthesized image data. The image processor 113 outputs the image data in which the above processes are implemented, to the display 114. The display 114 displays the image data in order to make a user check the taken image.

The image processor 113 further outputs the image data in which the above processes are implemented to the recorder 115. The recorder 115 records the image data in the recording medium.

The above operation can provide a good image having a high degree of sharpness even if the image pickup device 104 has many focus detection pixels.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims a foreign priority benefit based on Japanese Patent Application 2007-238948, filed on Sep. 14, 2007, which is hereby incorporated by reference herein in its entirety as if fully set forth herein.

FIELD OF INDUSTRIAL APPLICATION

The present invention provides an imaging apparatus that can implement both focus control of a contrast detection method that utilizes a focus detection pixel and focus control of a contrast detection method that utilizes a pixel other than the focus detection pixel, in addition to focus control of a phase difference detection method that utilizes a focus detection pixel.

The invention claimed is:

1. An imaging apparatus comprising:
an image pickup device that includes a first pixel group configured to photoelectrically convert an object image formed by a luminous flux from an imaging optical system, and a second pixel group which includes a plurality of pixels configured to photoelectrically convert a split pair of the luminous flux from the imaging optical system; and
a detecting unit configured to implement a first detection control that changes an imaging state of the image pickup device while detecting a contrast of the object image based on an output of the second pixel group, and then a second detection control that changes the imaging state of the image pickup device while detecting the contrast of the object image based on an output of the first pixel group.

2. An imaging apparatus comprising:
an image pickup device that includes a first pixel group configured to photoelectrically convert an object image formed by a luminous flux from an imaging optical system, and a second pixel group which includes a plurality of pixels configured to photoelectrically convert a split pair of the luminous flux from the imaging optical system; and
a controller configured to selectively implement one of a first focus control of a phase difference detection method that utilizes an output of the second pixel group, a second focus control of a contrast detection method that utilizes an output of the first pixel group, and a third focus control of a contrast detection method that utilizes an output of the second pixel group.

3. An imaging apparatus according to claim 2, wherein the controller selects the first focus control or a combination of the second and third focus controls based on a defocus amount of the imaging optical system.

4. An imaging apparatus according to claim 3, wherein the controller implements the first focus control when the defocus amount is smaller than a threshold, and implements the second and third focus controls when the defocus amount is larger than the threshold.

5. An imaging apparatus according to claim 2, wherein the controller implements the third focus control prior to the second focus control in implementing the second and third focus controls.

6. A control method for an imaging apparatus which provides an image pickup device that includes a first pixel group configured to photoelectrically convert an object image formed by a luminous flux from an imaging optical system, and a second pixel group which includes a plurality of focus detection pixels configured to photoelectrically convert a split one of the luminous fluxes from the imaging optical system, the control method comprising steps of:
implementing a first focus control of a phase difference detection method which utilizes an output of the second pixel group;
implementing a second focus control of a contrast detection method which utilizes an output of the first pixel group;
implementing a third focus control of a contrast detection method which utilizes an output of the second pixel group; and
changing a focus control to be implemented among the first to third focus controls.

* * * * *